United States Patent
Han et al.

(10) Patent No.: US 7,873,118 B2
(45) Date of Patent: Jan. 18, 2011

(54) APPARATUS AND METHOD FOR CONTROLLING PEAK TO AVERAGE POWER RATIO (PAPR)

(75) Inventors: Seung Hee Han, Seoul (KR); Min Seok Noh, Seoul (KR); Yeong Hyeon Kwon, Suwon-si (KR)

(73) Assignee: LG Electronics Inc., Seoul (KR)

( * ) Notice: Subject to any disclaimer, the term of this patent is extended or adjusted under 35 U.S.C. 154(b) by 864 days.

(21) Appl. No.: 11/685,103

(22) Filed: Mar. 12, 2007

(65) Prior Publication Data

US 2007/0211807 A1    Sep. 13, 2007

(30) Foreign Application Priority Data

Mar. 13, 2006    (KR) ..................... 10-2006-0023113

(51) Int. Cl.
*H04K 1/02* (2006.01)
(52) U.S. Cl. ..................................... 375/296
(58) Field of Classification Search ............. 370/208, 370/346, 518; 375/243, 260, 296, 346, 354
See application file for complete search history.

(56) References Cited

U.S. PATENT DOCUMENTS

| | | | | |
|---|---|---|---|---|
| 5,754,592 A | * | 5/1998 | Flowers et al. | 375/243 |
| 7,292,639 B1 | * | 11/2007 | Demirekler et al. | 375/260 |
| 2004/0184487 A1 | * | 9/2004 | Kim | 370/516 |
| 2005/0254587 A1 | | 11/2005 | Kim et al. | |
| 2006/0274843 A1 | * | 12/2006 | Koo et al. | 375/260 |
| 2007/0041311 A1 | * | 2/2007 | Baum et al. | 370/208 |
| 2007/0165591 A1 | * | 7/2007 | Higure et al. | 370/346 |

FOREIGN PATENT DOCUMENTS

| | | |
|---|---|---|
| EP | 1596551 | 11/2005 |
| EP | 1601150 | 11/2005 |

* cited by examiner

*Primary Examiner*—David C Payne
*Assistant Examiner*—Leon-Viet Q Nguyen
(74) *Attorney, Agent, or Firm*—Lee, Hong, Degerman, Kang & Waimey

(57) ABSTRACT

An apparatus for controlling PAPR in an OFDM communication system and method thereof are disclosed, by which implementation is simplified and enhanced PAPR characteristics are provided. The present application includes outputting $GN_b$ data symbols by oversampling $N_b$ parallel data symbols, spreading the oversampled data symbols using DFT, and mapping the spread signal to subcarriers.

2 Claims, 5 Drawing Sheets

APPARATUS AND METHOD FOR CONTROLLING PEAK TO AVERAGE POWER RATIO (PAPR)

This application claims the benefit of the Korean Patent Application No. 10-2006-0023113, filed on Mar. 13, 2006, which is hereby incorporated by reference as if fully set forth herein.

BACKGROUND OF THE INVENTION

1. Field of the Invention

The present disclosure relates to controlling PAPR. Although the present disclosure is suitable for a wide scope of applications, it is particularly suitable for decreasing PAPR characteristics in an orthogonal frequency division multiplexing (hereinafter abbreviated OFDM) system.

2. Discussion of the Related Art

Generally, in the OFDM system, signal processing is performed on a channel tending to have frequency-selective fading in a frequency domain to bring about flat fading. So, the OFDM system enables more efficient communications. Due to this advantage, the OFDM is widely adopted by wireless communication systems.

Meanwhile, the OFDM system has a problem of a peak to average power ratio (hereinafter abbreviated PAPR). If the PAPR is big, a power amplifier having a large linear interval to amplify a signal corresponding to a peak power is needed. Yet, a product cost for manufacturing the power amplifier having the large linear interval is too high. In case that a power amplifier has a small linear interval, a signal amplified in a non-linear interval gets distorted.

To decreasing the PAPR, various methods have been proposed. As an example of the methods, variants of OFDM like SC-FDMA, offset DFT-SOFDM and precoded DFT-S-OFDM are provided. In these methods of modifying OFDM signal generation, PAPR characteristics of a transmission signal is enhanced in a manner of spreading a transmission data vector by DFT before mapping data to subcarriers in a frequency domain and then mapping the data to the subcarriers. In the methods of modifying OFDM signal generation, it is in common that a signal is spread by DFT. In particular, since the data signal mapped by the subcarriers is performed by IDFT at a final transmission step, powers of signals having peak powers are cancelled out to reduce a power variation of the final transmission signal.

FIG. 1 is a block diagram of an example of an OFDM signal generator supporting SC-FDMA, Referring to FIG. 1, a serial-to-parallel converting unit 11 converts a data symbol inputted in series to a parallel signal. A signal spreading unit 12 performs a dispreading on the paralleled data symbol in a frequency domain using Discrete Fourier Transform (hereinafter abbreviated DFT) before generating an OFDM signal. Equation 1 indicates a method of dispreading a parallel signal using $N_b s N_b$ DFT matrix.

$$s_F = F_{N_b \times N_b} s_x \quad \text{[Equation 1]}$$

In Equation 1, 'N' indicates the number of subcarriers provided to an OFDM signal, '$s_x$' indicates a data symbol vector, '$s_F$' indicates a vector of which data is spread in a frequency domain, and '$s_{Tx}$' indicates an OFDM symbol vector transmitted in a time domain. Moreover, '$F_{N_b \times N_b}$' is a DFD matrix of '$N_b s N_b$' used in dispreading a data symbol.

A subcarrier mapping unit 13 maps the spread vector $s_F$ to subcarrier using a subcarrier allocating pattern. An Inverse Discrete Fourier Transform (hereinafter abbreviated IDFT) unit 14 transforms the signal mapped to the subcarrier into a signal in a time domain. Equation 2 represents Inverse Discrete Fourier Transform.

$$s_{Tx} = F_{N \times N}^{-1} s_F \quad \text{[Equation 2]}$$

In Equation 2, $F_{N \times N}$ is $N_b s N_b$ DFT matrix used to transform a signal in a frequency domain to a signal in a time domain and $s_{Tx}$ is a signal generated in a time domain by IDFT, A parallel-to-serial converting unit 15 converts the parallel signal converted in a time domain to a serial signal. A cyclic prefix inserting unit 16 inserts a cyclic prefix in a signal to avoid interference between OFDM symbols and then transmits the signal.

The offset DFT-S-OFDM system improves the PAPR performance of the SC-FDMA. Yet, the offset DFT-S-OFDM system requires a considerable load of calculations to make its implementation complicated. In particular, in the process of performing DFT dispreading, DFT matrix is applied in a manner of separating an input symbol into a real part and an imaginary part. So, the calculation load increases to make the corresponding implementation more complicated. Hence, the demand for a system, of which implementation is simpler than the offset DFT-S-OFDM system with PAPR performance better than that of the offset DFT-S-OFDM system, rises.

SUMMARY OF THE INVENTION

Accordingly, the present application is directed to control PAPR and method thereof that substantially obviates one or more problems due to limitations and disadvantages of the related art.

An object of the present application is to provide an apparatus for controlling PAPR in an OFDM system and method thereof, by which implementation is simplified and by which enhanced PAPR characteristics are provided.

Additional advantages, objects, and features of the application will be set forth in part in the description which follows and in part will become apparent to those having ordinary skill in the art upon examination of the following or may be learned from practice of the application. The objectives and other advantages of the application may be realized and attained by the structure particularly pointed out in the written description and claims hereof as well as the appended drawings.

To achieve these objects and other advantages and in accordance with the purpose of the application, as embodied and broadly described herein, a method of controlling PAPR (peak to average power ratio), which is applied to a mobile communication system, according to the present application includes the steps of outputting $GN_b$ data symbols by oversampling $N_b$ parallel data symbols, spreading the oversampled data symbols using DFT (discrete Fourier transform), and mapping the spread signal to subcarriers.

In another aspect of the present application, a method of controlling PAPR (peak to average power ratio), which is applied to a mobile communication system, includes the steps of spreading $N_b$ parallel data symbols using DFT (discrete Fourier transform), shifting a phase of each of the spread data symbols by a phase value corresponding to a case of oversampling the corresponding data symbol, summing the spread data symbol and the phase-shifted data symbol, and mapping the summed symbols to subcarriers.

In another aspect of the present application, an apparatus for controlling PAPR (peak to average power ratio), which is applied to a mobile communication system, includes an oversampling unit outputting $GN_b$ data symbols by oversampling $N_b$ parallel data symbols, a discrete Fourier transform unit spreading the oversampled data symbols using DFT (discrete Fourier transform), and a subcarrier mapping unit mapping the spread signal to subcarriers.

In another aspect of the present application, an apparatus for controlling PAPR (peak to average power ratio), which is applied to a mobile communication system, includes a discrete Fourier transform unit spreading $N_b$ parallel data symbols using DFT (discrete Fourier transform), a phase shift unit shifting a phase of each of the spread data symbols by a phase value corresponding to a case of oversampling the corresponding data symbol, a signal summing unit summing the spread data symbol and the phase-shifted data symbol, and a subcarrier mapping unit mapping the summed symbols to subcarriers.

It is to be understood that both the foregoing general description and the following detailed description of the present application are exemplary and explanatory and are intended to provide farther explanation of the application as claimed.

BRIEF DESCRIPTION OF THE DRAWINGS

The accompanying drawings, which are included to provide a further understanding of the application and are incorporated in and constitute a part of this application, illustrate embodiment(s) of the application and together with the description serve to explain the principle of the application. In the drawings.

DETAILED DESCRIPTION OF THE INVENTION

Reference will now be made in detail to the preferred embodiments of the present application, examples of which are illustrated in the accompanying drawings. Wherever possible, the same reference numbers will be used throughout the drawings to refer to the same or like parts.

In case that a signal is spread in a frequency domain based on DFT, if a length of a data vector is $N_b$, a maximum number $N_b$ of data vectors appear in a transmission signal. Hence, it is able to decrease PAPR in a manner that input data appear in the transmission signal as many as possible. And, oversampling can be performed to increase a size of the input data with maintaining a size of the transmission data. In particular, after oversampling has been performed on the data vectors, the oversampled vectors are transformed to be transmitted.

Figure 1:
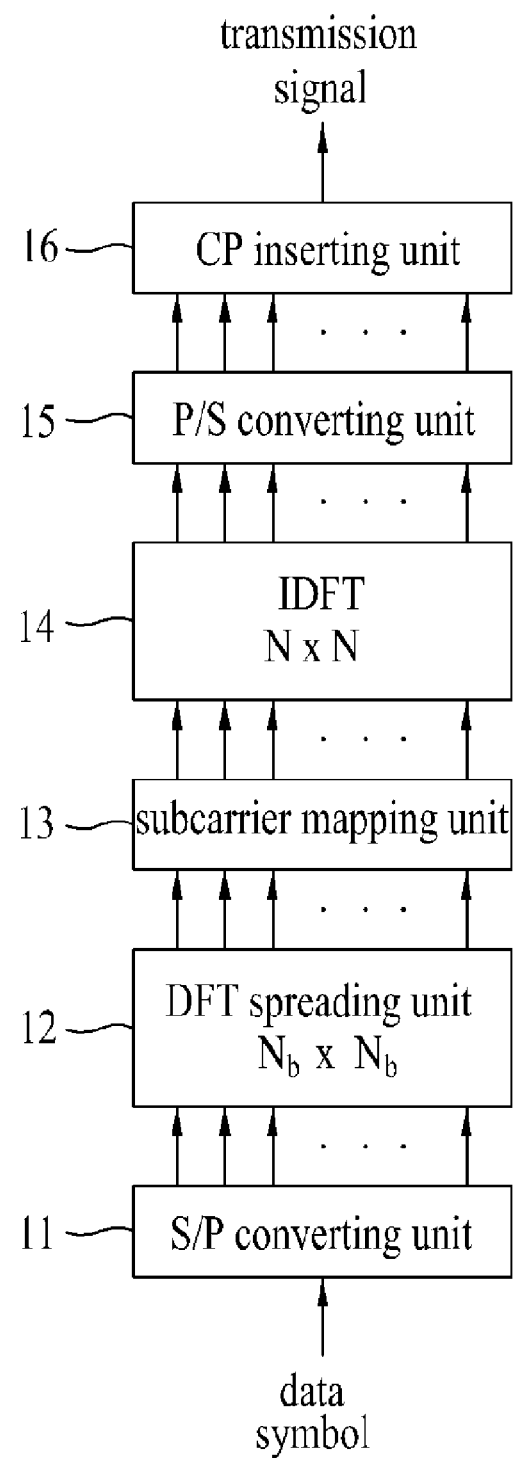
FIG. 1 is a block diagram of an OFDM signal generator according to SC-FDMA.
Figure 2:
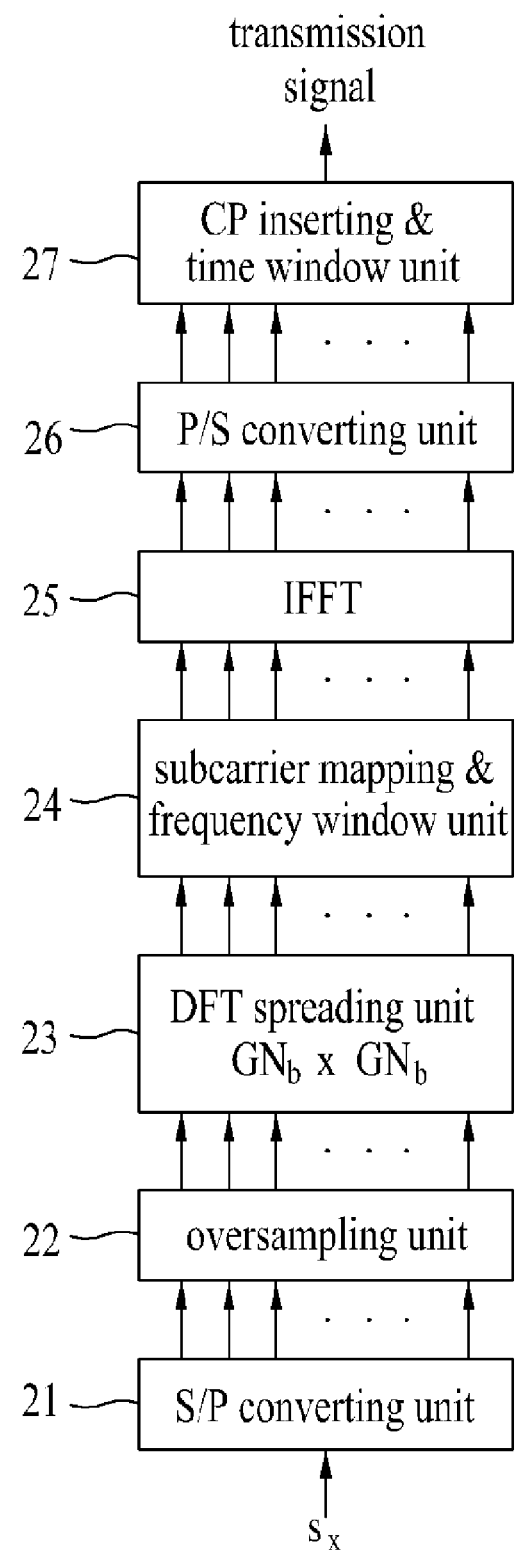
FIG. 2 is block diagram of an OFDM system according to a first embodiment.

FIG. 2 is block diagram of an OFDM system according to a first embodiment.

Referring to FIG. 2, a serial-to-parallel converting unit 21 converts a data symbol inputted in series to a parallel signal. And, an oversampling unit 22 oversamples $N_b$ data symbols G-times (oversampling coefficient) to extend a number of input symbols by G times with maintaining a number of independent data symbols. In the following description, an example of 'G=2' is explained.

First of all, assuming that a signal $s_x$ which is inputted to the oversampling unit 22 after being converted in parallel by the serial-to-parallel converting unit 21 is $[s_x(0), s_x(1)\ 0\ s_x(N_b-1)]^T$, Equation 3 indicates a method of oversampling data symbols.

$$s_{xo} = s_{xo}^1 + s_{xo}^2 \qquad \text{[Equation 3]}$$

Figure 4:
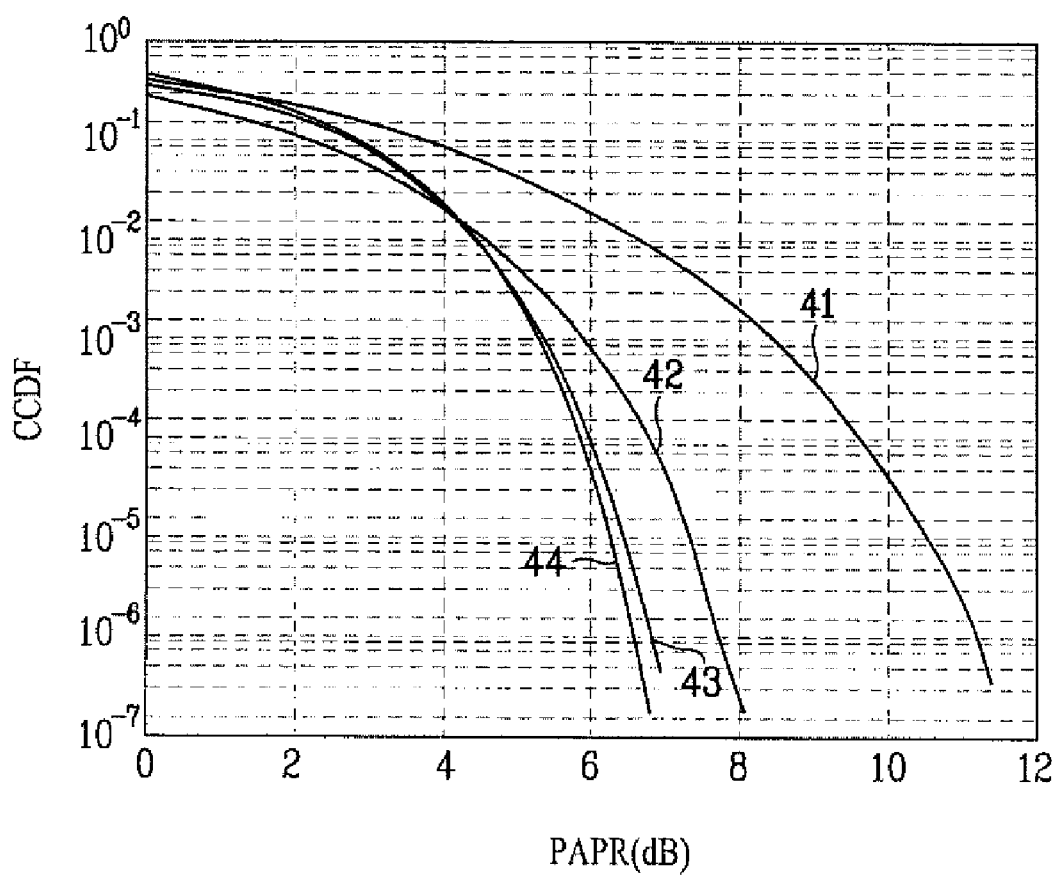
FIG. 4 is a graph of PAPR performance of an OFDM system according to one embodiment.
Figure 5:
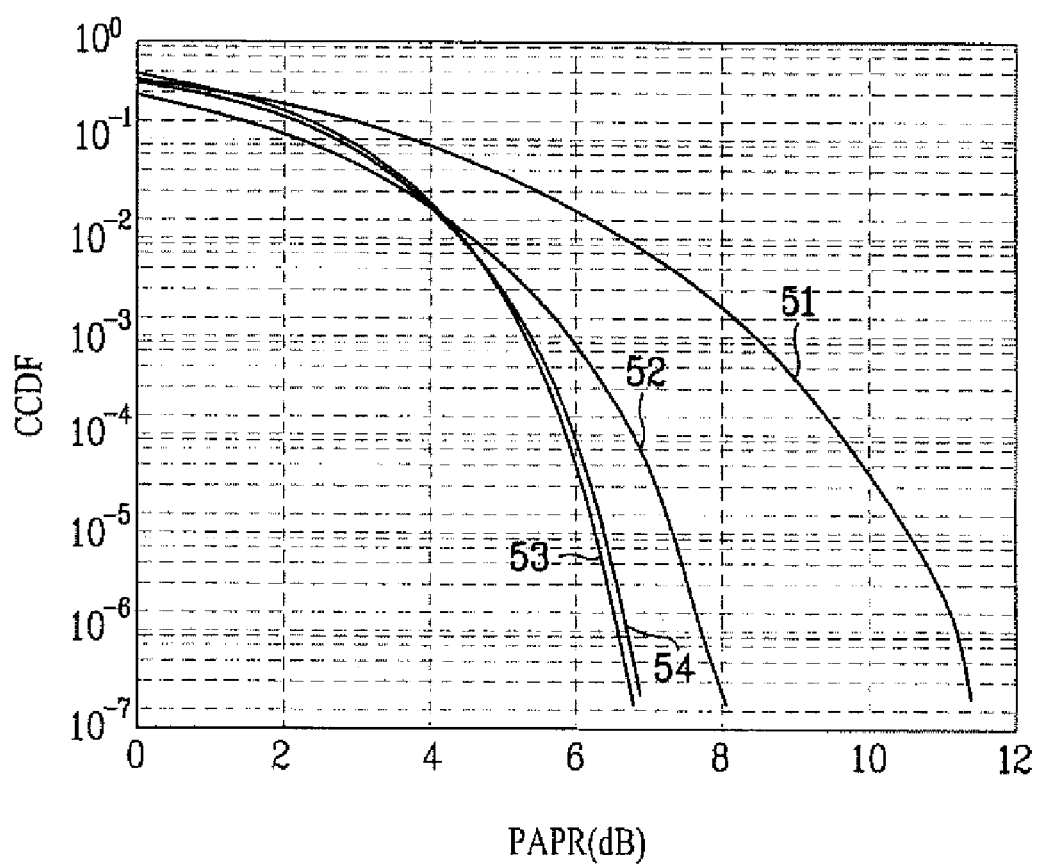
FIG. 5 is a graph of PAPR performance of an OFDM system according to another embodiment.

In Equation 3, $s_{xo}$ is a result from oversampling of the input signal $s_x$, and $s_{xo}^1$ and $s_{xo}^2$ are shown in FIG. 4 and FIG. 5 respectively.

$$s_{xo}^1 = [s_x(0)\ 0\ s_x(1)\ 0 \ldots s_x(N_b-1)\ 0]^T \qquad \text{[Equation 4]}$$

$$s_{xo}^2 = [0\ s_x(0)\ 0\ s_x(1) \ldots 0\ s_x(N_b-1)]^T \qquad \text{[Equation 5]}$$

In Equation 5, $s_{xo}^2$ is exemplarily generated by shifting $s_{xo}^1$ by one by one. Yet, $s_{xo}^2$ can be generated by shifting $s_{xo}^1$ by an arbitrary k.

A discrete Fourier transform unit 23 performs DFT on the oversampled signal to bring about a dispreading effect in a frequency domain. And, the DFT can be expressed as Equation 6.

$$s_{Fo} = s_{Fo}^1 + s_{Fo}^2 \qquad \text{[Equation 6]}$$

In Equation 6, $s_{Fo}^1$ and $s_{Fo}^2$ can be represented as Equation 7 and Equation 8, respectively.

$$s_{Fo}^1 = F_{2N_b \times N_b} s_{xo}^1 \qquad \text{[Equation 7]}$$

$$s_{Fo}^2 = F_{2N_b \times N_b} s_{xo}^2 \qquad \text{[Equation 8]}$$

In this case, $F_{2N_b, N_b}$ is a transform matrix consisting of upper $N_b$ of $F_{2N_b, 2N_b}$. A subcarrier mapping & frequency window unit 24 maps the DFT-performed signal to subcarrier and then executes a frequency window.

The frequency-domain signal mapped to the subcarrier is inputted to an inverse Fourier transform unit 25. The inverse Fourier transform unit 25 performs Inverse Fast Fourier Transform (hereinafter abbreviated IFFT) on the input signal to transform it into a time-domain signal. And, a parallel-to-serial converting unit 26 converts the time-domain transformed parallel signal to a serial signal.

A cyclic prefix (hereinafter abbreviated CP) inserting & time window unit 24 to eliminate interference between OFDM symbols adds a CP to the serial signal and then executes a time window.

Figure 3:
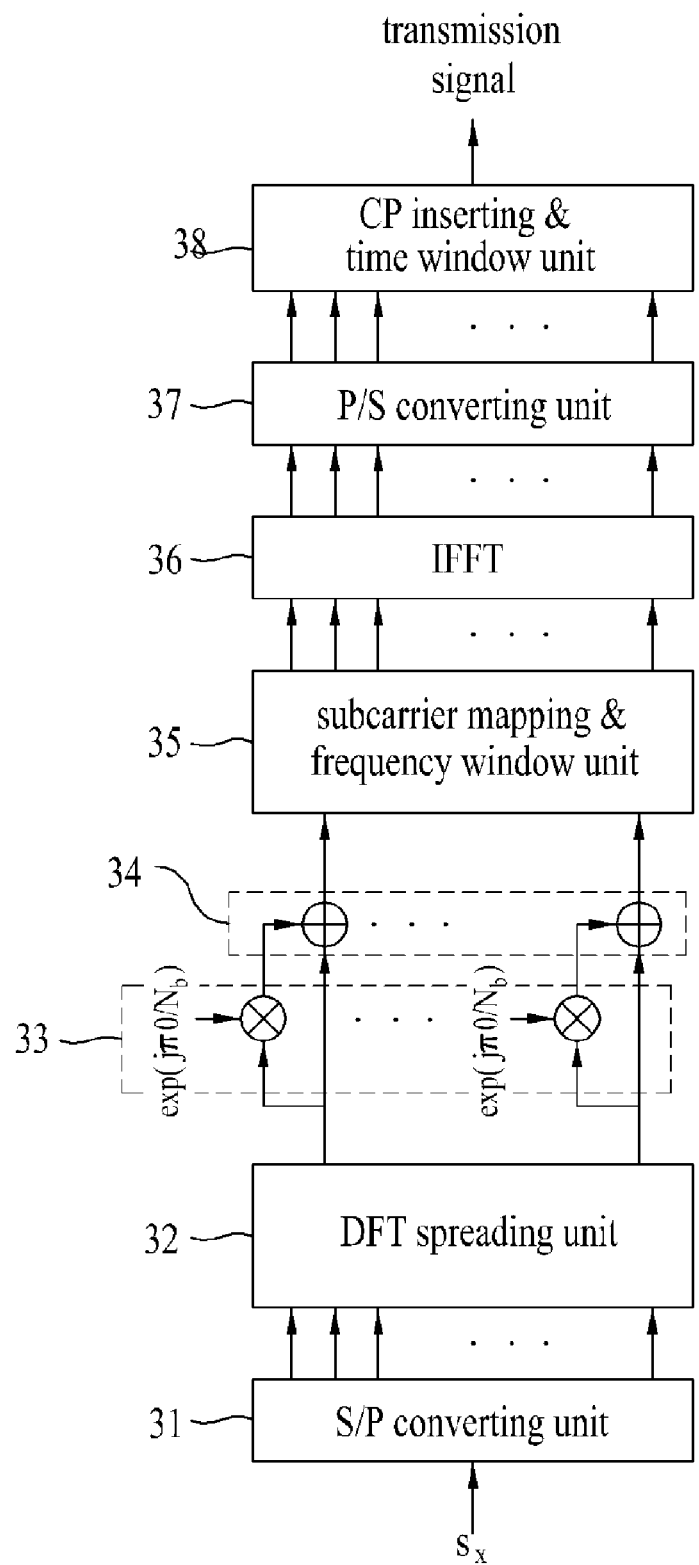
FIG. 3 is block diagram of an OFDM system according to a second embodiment.

FIG. 3 is block diagram of an OFDM system according to a second embodiment of the present application.

Referring to FIG. 3, the respective components of $s_{Fo}^1$ and $s_{Fo}^2$ in Equation 7 and Equation 8 can be represented as Equation 9.

$$\begin{aligned}
s_{Fo}^1(p) &= \sum_{k=0}^{2N_b-1} \exp\left(\frac{j2\pi pk}{2N_b}\right) s_{xo}^1 \qquad \text{[Equation 9]}\\
&= \sum_{k'=0}^{N_b-1} \exp\left(\frac{j2\pi p(2k')}{2N_b}\right) s_{xo}^1 \\
&= s_F(p)
\end{aligned}$$

$$\begin{aligned}
s_{Fo}^2(p) &= \sum_{k=0}^{2N_b-1} \exp\left(\frac{j2\pi pk}{2N_b}\right) s_{xo}^2 \\
&= \sum_{k'=0}^{N_b-1} \exp\left(\frac{j2\pi p(2k'+1)}{2N_b}\right) s_{xo}^2 \\
&= \exp\left(\frac{j2\pi p}{2N_b}\right) s_F(p)
\end{aligned}$$

In Equation 9, if the oversampled vector is transformed, the result is related to an original signal $S_F$. And, $s_{Fo}^1$ and $s_{Fo}^2$ differ from each other in a phase component. Hence, the OFDM system shown in FIG. 2 can be implemented by the method shown in FIG. 3.

Similar to the former embodiment shown in FIG. 2, a serial-to-parallel converting unit 31 converts a data symbol inputted in series to a parallel signal. And, a discrete Fourier transform unit 32 performs spreading on the parallel-converted data symbol using DFT matrix of $N_b \times N_b$.

As shown in Equation 9, if phases of the respective spread input symbols are shifted and summed, it brings about the same effect of oversampling.

So, a phase shifting unit 33 shifts a phase of the input symbol in a manner shown in Equation 9. And, a summing unit 34 generates a signal resulting from summing an input phase shifted symbol and an non-shifted symbol. FIG. 3 shows a case that a value of G (oversampling coefficient) is 2. Yet, the number of input signals inputted to the summing unit 34 is normally 'G'. For instance, if G is 3, a signal outputted from the discrete Fourier transform unit 32, a signal resulting from performing a first phase shift on the signal outputted from the discrete Fourier transform unit 32, and a signal resulting from performing a second phase shift on the signal outputted from the discrete Fourier transform unit 32 are summed up.

A subcarrier mapping & frequency window unit 35 maps the DFT-performed signal to subcarrier and then executes a frequency window. The frequency-domain signal mapped to the subcarrier is inputted to an inverse Fourier transform unit 36. The inverse Fourier transform unit 36 transforms the inputted signal into a time-domain signal by performing inverse fast Fourier transform (hereinafter abbreviated IFFT) on the inputted signal. A parallel-to-serial converting unit 37 converts the parallel signal transformed into the time-domain signal to a serial signal. And, a cyclic prefix (hereinafter abbreviated CP) inserting & time window unit 38 to avoid interference between OFDM symbols adds CP to the serially converted signal and then executes a time window.

FIG. 4 is a graph of PAPR performance of an OFDM system according to one embodiment.

First of all, in FIG. 4, if N=512, $N_b$=128 and if subcarriers are allocated to a continuous subcarrier group, PAPR performance of each system is represented as CCDF (complementary cumulative distribution function) over PAPR.

Referring to FIG. 4, a curve 41 indicates PAPR performance of an OFDM system in case of not using a system for PAPR performance enhancement, and a curve 42 indicates PAPR performance in case of applying SC-FDMA system.

A curve 43 indicates PAPR performance in case of applying Offset-DFT-S-OFDM SC-FDMA, and a curve 44 indicates PAPR performance of an OFDM system according to the present application.

FIG. 5 is a graph of PAPR performance of an OFDM system according to another embodiment.

In FIG. 5, if N=512, $N_b$=64 and if subcarriers are allocated to a continuous subcarrier group, PAPR performance of each system is represented as CCDF (complementary cumulative distribution function) over PAPR.

Referring to FIG. 5, a curve 51 indicates PAPR performance of an OFDM system in case of not using a system for PAPR performance enhancement, and a curve 52 indicates PAPR performance in case of applying SC-FDMA system.

A curve 53 indicates PAPR performance in case of applying Offset-DFT-S-OFDM SC-FDMA, and a curve 54 indicates PAPR performance of an OFDM system according to the present application.

Accordingly, the present application provides the following effect or advantage.

Most of all, the present application enables PAPR to be efficiently controlled with a simple structure for implementation.

It will be apparent to those skilled in the art that various modifications and variations can be made in the present application without departing from the spirit or scope of the applications. Thus, it is intended that the present application covers the modifications and variations of this application provided they come within the scope of the appended claims and their equivalents.

What is claimed is:

1. A method of transmitting signals from a transmitter for controlling peak to average power ratio (PAPR) used in a mobile communication system, the method comprising:

outputting '$N_b$' parallel data symbols from a serial to parallel converter using serial data;

outputting '$G*N_b$' oversampled data symbols by oversampling each of the '$N_b$' parallel data symbols in an oversampling unit 'G' times;

spreading the '$G*N_b$' oversampled data symbols in a frequency domain in a discrete Fourier transform (DFT) unit using a DFT matrix to generate a spread signal;

mapping the spread signal to subcarriers in a subcarrier mapping unit; and transmitting the subcarrier-mapped signal to a receiver in a transmitting unit, wherein when 'G' is 2:

the oversampling is performed using a first equation defined as:

$$s_{xo} = s_{xo}^1 + s_{xo}^2,$$

wherein $s_{xo}$ is an oversampled vector, wherein $s_{xo}^1$ is determined by using a second equation defined as:

$$s_{xo}^1 = [s_x(0)\ 0\ s_x(1)\ 0\ \ldots\ s_x(N_b-1)\ 0]^T$$

and wherein $s_{xo}^2$ is a data vector generated by shifting a component of the $s_{xo}^1$.

2. An apparatus for controlling peak to average power ratio (PAPR) in a mobile communication system, the apparatus comprising:

a serial to parallel converter outputting $N_b$ parallel data symbols using serial data;

an oversampling unit configured to output '$G*N_b$' oversampled data symbols by oversampling each of '$N_b$' parallel data symbols from the serial to parallel converter;

a discrete Fourier transform (DFT) unit configured to spread the '$G*N_b$' oversampled data symbols in a frequency domain using a DFT matrix to generate a spread signal;

a subcarrier mapping unit configured to map the spread signal to subcarriers; and a transmitting unit configured to transmit the subcarrier-mapped signal to a receiver, wherein when 'G' is 2:

the oversampling is performed using a first equation defined as:

$$s_{xo} = s_{xo}^1 + s_{xo}^2,$$

wherein $s_{xo}$ is an oversampled vector, wherein $s_{xo}^1$ is determined using a second equation defined as:

$$s_{xo}^1 = [s_x(0)\ 0\ s_x(1)\ 0\ \ldots\ s_x(N_b-1)\ 0]^T$$

and wherein $s_{xo}^2$ is a data vector generated by shifting a component of the $s_{xo}^1$.

* * * * *